United States Patent [19]

McElroy

[11] 4,071,395
[45] Jan. 31, 1978

[54] APPARATUS FOR CREATING SEGMENTED POLYETHYLENE PIPE TURNS

[76] Inventor: Arthur H. McElroy, 2789 E. 45th Place, Tulsa, Okla. 74105

[21] Appl. No.: 704,382

[22] Filed: July 12, 1976

[51] Int. Cl.² ............................................. B29C 19/00
[52] U.S. Cl. ..................................... 156/499; 156/304
[58] Field of Search ......................... 156/304, 158, 499; 285/179, 184, 181

[56] References Cited

U.S. PATENT DOCUMENTS

| 2,479,580 | 8/1949 | Marco | 285/181 X |
| 2,886,262 | 5/1959 | Fletcher | 285/179 X |
| 3,729,360 | 4/1973 | McElroy | 156/304 X |

FOREIGN PATENT DOCUMENTS

| 75,632 | 8/1970 | Germany | 156/304 X |

*Primary Examiner*—David A. Simmons

*Attorney, Agent, or Firm*—Head, Johnson & Chafin

[57] ABSTRACT

Method and apparatus for construction angle fittings and large sweeps of polyethylene pipe by the fusion process, which comprises the preparation of short pipe segments of which both faces are cut at a selected angle (90-A) to the axis of the pipe. Both faces are cut at the same angle, so that the included angle at the two faces is equal to 2A. A conventional fusion pipe joining apparatus, which normally holds two pipes colinear, for fusion at a plane of juncture which is perpendicular to the axis of the pipe, is modified to have inserts into the pipe clamping means, so that the axes of the pipe segments are at the selected angle A. When two segments are clamped respectively in the fixed clamp and the movable clamp are brought together, the contiguous faces will be plane, parallel and will have the same elliptical contour, and can be joined by the fusion process. Additional segments can be added to the ends until a sweep of any desired total angle of turn is constructed.

3 Claims, 7 Drawing Figures

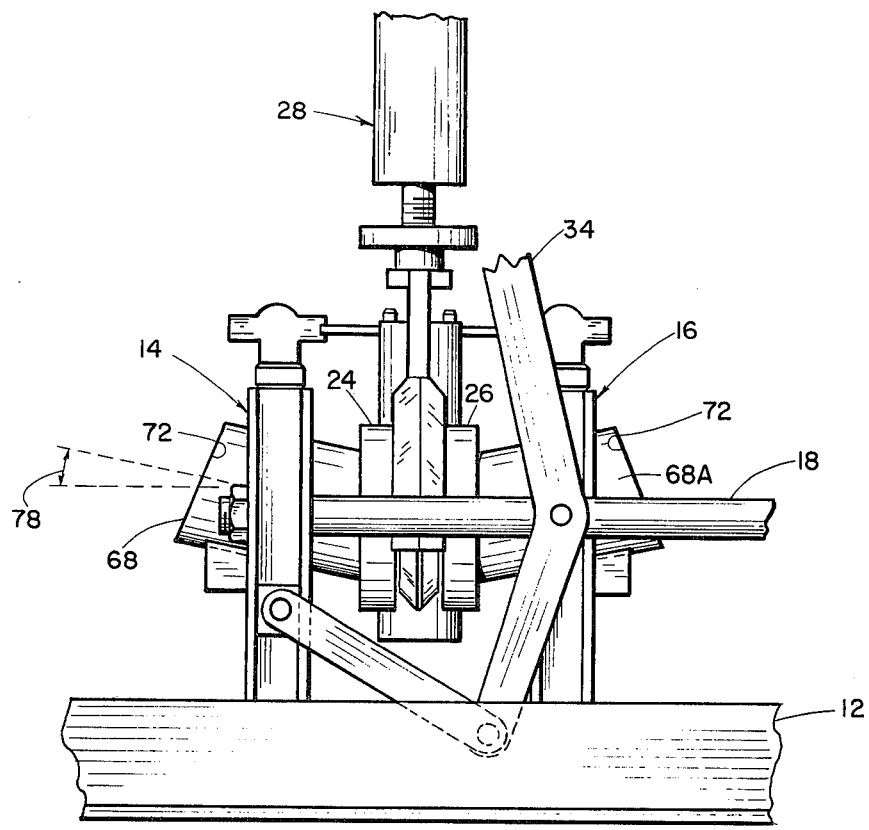
Fig. 5
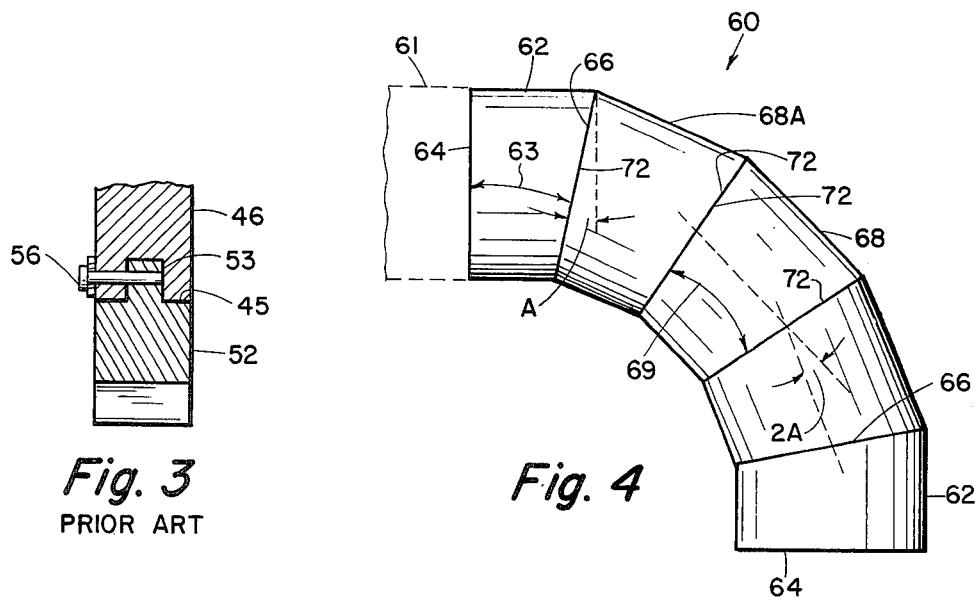
Fig. 3
PRIOR ART
Fig. 4

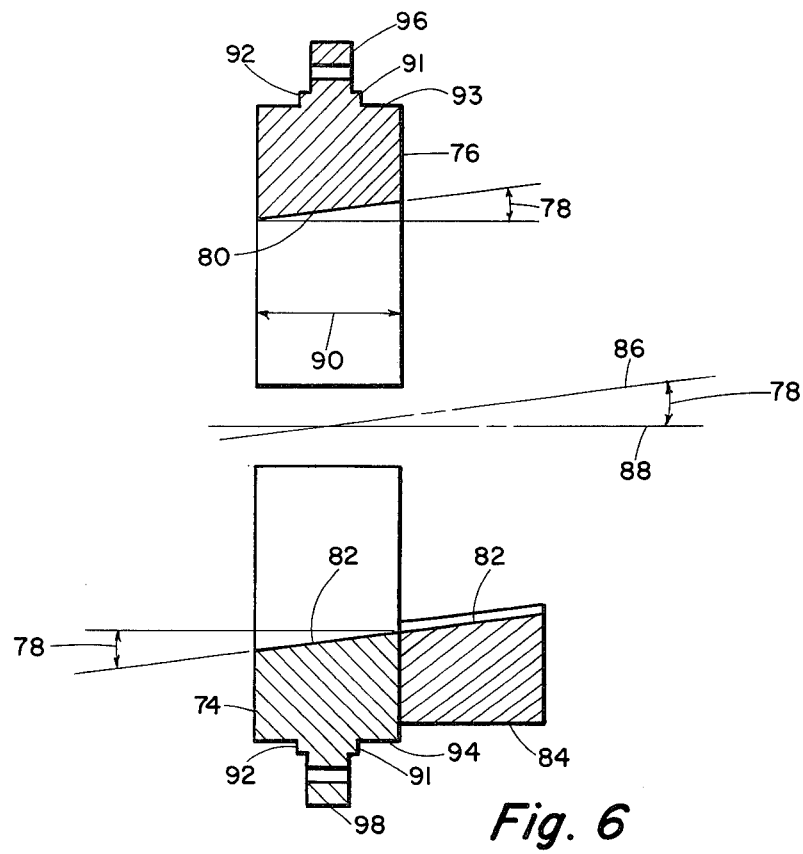
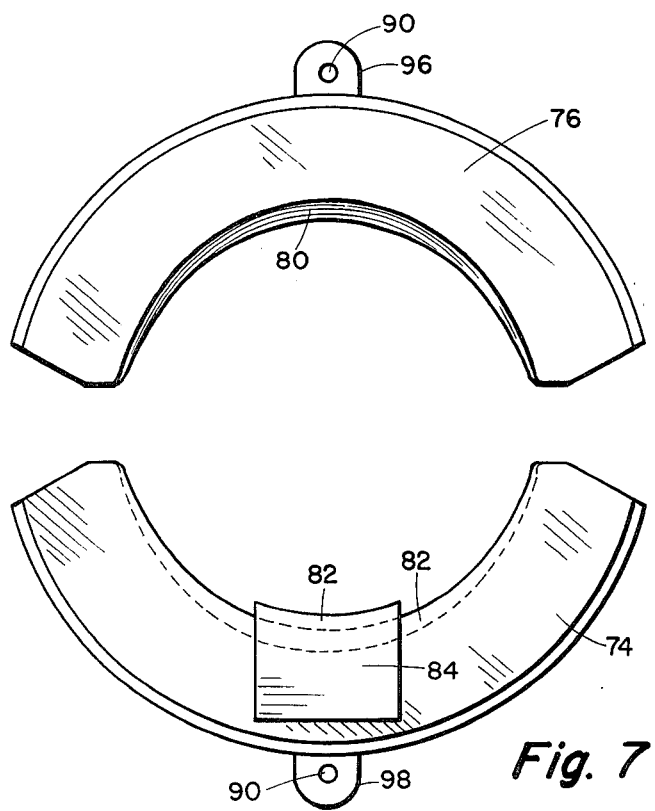

APPARATUS FOR CREATING SEGMENTED POLYETHYLENE PIPE TURNS

BACKGROUND OF THE INVENTION

This invention lies in the field of polyethylene piping.

More particularly, this invention lies in the field of large diameter polyethylene pipes for which large angle ells, or large sweeps are required, for turning the pipe through large angles.

In the prior art, it has been known that polyethylene pipe can be joined by taking two lengths of pipe and clamping them coaxially, in end-to-end relation, heating the opposed faces to a selected temperature at which the polyethylene softens to the proper degree, and then pressing the two ends together axially, with sufficient force to cause the softened ends to be intimately fused. See U.S. Pat. Nos. 3,729,360 and 3,846,208. This will provide a permanent weld, which has sufficient strength to match that of the pipe. However, the problem of how to construct angular combinations of polyethylene pipe where the diameter of the pipe was such that it could not be bent, by softening and bending, etc., has not been met, especially for on-the-job field use. Where such angular turns or sweeps were required, it has been customary to use piping of other material, joined to the polyethylene pipe, or the fittings were made elsewhere as a separate item of sale.

SUMMARY OF THE INVENTION

It is, therefore, a principal object of this invention to provide a means of constructing large angle ells, turns and sweeps of polyethylene pipe while on the job or in the field using the pipe available.

It is a further object of this invention to provide an apparatus and method for constructing large angle ells, turns and sweeps, by preparing a plurality of short segments of pipe, with faces cut at a selected angle to the axis of the pipe, and joining these segments end-to-end.

It is a further object of this invention to provide a means for preparing the segments by clamping a length of pipe, cutting one face at a selected angle to the axis by turning the clamping means with respect to the plane of the saw, or turning the saw so that its plane is at a selected angle to the axis, making a first cut. Rotating the pipe 180° in its clamp and moving it longitudinally a selected distance and making a second cut, whereby the segment of pipe will have two faces, the planes of which will intersect at twice the selected angle.

These and other objects are realized and the limitations of the prior art are overcome in this invention by preparing a plurality of segments of pipe, of a selected diameter, by cutting them of a selected length, with the two faces of the segment at a selected angle with the axis of the pipe. Modified clamping inserts are utilized in prior-art pipe fusion apparatus, such that the pipe is clamped at an angle to the axis of the clamps, equal to that of the selected angle of cut of the segment. When the inserts of both the fixed and movable clamps have been made to have the same angle with the axis of machine, and when two segments are clamped in the clamps, the faces may be machined and caused to contact each other plane and parallel, and subsequently heated and joined by the fusion method, just the same as if these faces were a part of a pair of coaxial pipes. However, the contact face of the pipes will be elliptical instead of circular, and the machining elements and heating elements must have sufficient surface area so as to provide the proper heating over the complete contour of the faces of the two segments of pipe.

Preferably the end segments of the sweep will have one face cut at the selected angle to the axis and the other face cut perpendicular to the axis. Then, the previously prepared sweep or ell can be clamped in one of the two clamps of a fusion machine, and a length of pipe in the other clamp and the two then joined by the fusion method.

BRIEF DESCRIPTION OF THE DRAWINGS

These and other objects and advantages of this invention and a better understanding of the principles and details of the invention will be evident from the following description taken in conjunction with the appended drawings in which;

FIGS. 1, 2 and 3 illustrate details of the prior art fusion machines, which have been built for joining two pipes in coaxial arrangement.

FIG. 4 illustrates a 90° ell which is constructed on the basis of this invention.

FIG. 5 illustrates a modification of the apparatus of FIG. 1 for the purpose of joining by fusion two segments of the ell shown in FIG. 4.

FIGS. 6 and 7 show details of the inserts which are used in the clamps of the fusion machine of FIG. 5, which have been modified so that the cylindrical surface by which the pipe is clamped by the inserts, is at a selected angle to the longitudinal axis of the two clamps.

DESCRIPTION OF THE PREFERRED EMBODIMENT

Figure 1:
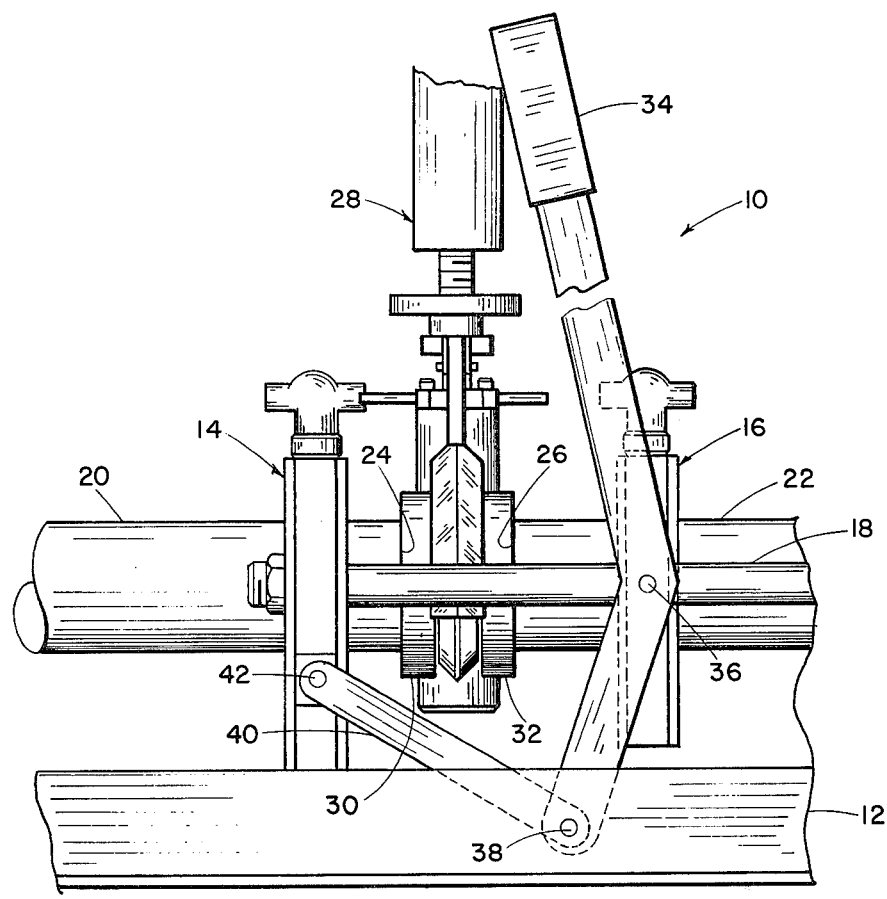
Figure 2:
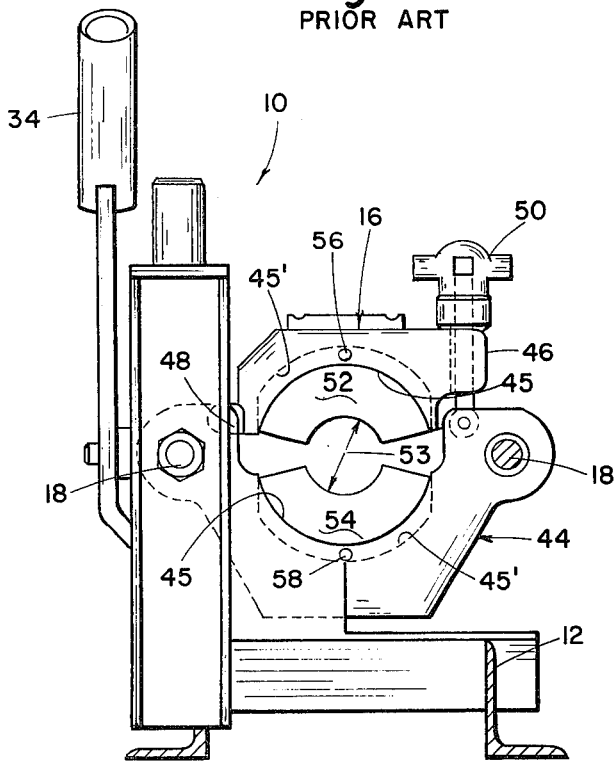

Referring now to the drawings and in particular to FIGS. 1, 2 and 3, there are shown portions of the FIGS. 1, 7 and 8 of U.S. Pat. No. 3,846,208 by the same inventor, which issued Nov. 5, 1974, entitled COMBINATION PIPE FUSION UNIT. U.S. Pat. Nos. 3,846,208 and 3,729,360 are representative of the present state of the art of polyethylen pipe fusion machines, and represent the types of machines with which this invention can be implemented. Essential material in said patents is incorporated herein by reference.

Referring now to FIG. 1, there is shown a fusion machine indicated generally by the numeral 10, which comprises a base frame 12, having a fixed clamp 14, which is attached rigidly to the base 12 and which is adapted to hold a cylindrical pipe 20 in a horizontal manner colinear with the frame 12.

There is a second pipe clamping frame 16 which is supported on a pair of horizontal parallel rods 18, which are supported in fixed relation to the frame 12, such that the clamp 16 can be moved parallel to itself, closer to, or farther away from the fixed clamp 14 by means of the lever 34.

The clamp 16 is shown in FIG. 2 as comprising a lower part 44 supported by the parallel rods 18, and an upper portion 46 which is hinged at the point 48. When locked in the position shown, it has a cylindrical aperture 45 comprised of two portions, one in each of the two parts 44 and 46 of the clamp. The inner surface of the two parts of the clamp are machined with an internal channel shown dotted as 45', to permit an insert 52 and 54 respectively to be positioned into the upper and lower portions of the clamp. The inserts have a cylindrical inner surface of a diameter 53 which is coaxial with that of the surface 45 but of smaller diameter. The inserts are routinely used to fit smaller pipes of selected diameters into the clamping surface 45. For each size of pipe there will be a different set of inserts.

FIG. 3 illustrates how the insert indicated as 52, with a circumferential ridge 53 fits into a slot in the inner surface of the upper clamp 46. There is a hole drilled through the clamp 46 and through the flange 53 of the insert, through which a pin 56 can be passed which holds the insert in place. The pins 56 and 58 are shown in FIG. 2, holding in position the upper insert 52 and the lower insert 54. The pins are simply for the purpose of holding the insert in position, and the force of clamping the pipe is carried by the shoulder represented by the surface 45 of the clamp.

So far the description of FIGS. 1, 2, and 3 represent the prior art apparatus.

FIG. 4 illustrates a type of ell, or sweep, which can be constructed by the method of this invention. It comprises a plurality of segments 68A, which can be prepared by cutting a pipe with its faces at a selected angle to the axis such that the planes of the two faces 72 of each of the segments are at a selected angle 69 which may vary as desired and depending on how large the radius of the sweep is to be.

Preferably, the end segments 62 of the sweep or the ell, will have one face which matches the angle of the segments 68 and the other face is perpendicular to the axis of the pipe. In other words, the angle of face 72 will be at an angle (90° − A), where A is a selected angle, and 63 = (90° − A). In the case of segments 68, the angle between the two faces will be 2A, which is also the angle between the axes of two adjacent segments. Since the face 64 is perpendicular to the axis of the pipe 62, it can be joined in a fusion apparatus with normal inserts to a length of pipe 61, as would be well known in the art. The pipe 61 as indicated by dashed line.

Referring now to FIG. 5, the apparatus of FIG. 1 is shown except for the inserts of the clamping means 14 and 16. These have been modified so that they hold a segment of pipe 68 at an angle 78 which is the angle A by which the faces have been cut with respect to the axis perpendicular to the pipe. This will be discussed further in connection with FIGS. 6 and 7.

By clamping one segment 68 in the clamp 14, in the proper orientation and at the angle 78, and the other segment 68A in the clamp 16, at the same selected angle 78 in the opposite direction, it will be clear that when the two faces 72 are brought together by moving the arm 34 to the left, they will be plane and parallel, and will come together along a joint or juncture, which will be elliptical rather than circular. If the heating surfaces 24 and 26 are sufficiently large so as to cover the elliptical surface of the joint, then the joint can be heated as is done in normal practice until the polyethylene becomes of the proper consistency. The heater 28 is then removed and the pipe segments are brought together by moving the clamp 16 to the left by means of lever 34, and the two ends of the segments 68 and 68A will be pressed tightly together and the material will fuse and become a strong joint.

Referring now to FIGS. 6 and 7, there are two views of the inserts, 76 in the top clamp, and 74 in the bottom clamp, of the clamps 14 and 16 respectively. These differ from the inserts shown in FIG. 2 in that the central bore represented by the surface 80 in the top insert and 82 in the bottom insert, form a portion of a cylindrical surface, the axis of which 86 is at an angle 78 from the axis 88 which is the axis of the center of the upper clamp 46 and the lower clamp 44 of FIG. 1.

Because of a nominal width, 90, of the insert, in order to get a suitable purchase on a pipe segment a block of metal 84 is attached as by welding or casting to the side of the insert 74 and the tool that bores the surfaces 80 and 82, will bore an extended portion of the surface 82 on the top of the block 84. Thus, there will be sufficient length of contact along the surface 82 for the pipe segment, pressed by the surface 80, to hold the pipe rigidly during the fusion process.

The inserts are guided in the upper and lower clamps 46 and 44 by means of the shoulders 91 and 92, and the inner surface 45 against the outer surface 93 and 94. The extensions 96 and 98 have hole 90 drilled for pins similar to the pins 56 and 58 shown in FIG. 2. This is for the purpose of locking these inserts into the upper and lower clamps, so that the clamp can be opened and closed about a pipe while the inserts are held rigidly to the upper and lower portions of the clamp.

By altering the insert in such a way that the cylindrical opening which will clamp a pipe is a selected angle 78 to the longitudinal axis of the two clamps. Two segments 68, and 68A can be held respectively in the fixed and movable clamps and they can be joined in a common contact surface which has previously been cut at the proper angle, and which can be machined by means of conventional blades which are used to face the two parallel surfaces of two pipe ends. The opposed surfaces can be heated by the common heating surfaces 24 and 26, of a conventional heater 28, which permits the two segments to be joined by the fusion process. As soon as the two segments have been joined and the joint is cooled, the clamps are opened and the two pipe segments are then removed. Segment 68A is then clamped in the fixed clamp 14 and a new segment replacing 68A is clamped in the movable clamp 16, and the process is repeated until a sufficient number of segments have been joined to create a sweep of the selected angle.

As pointed out in FIG. 4, the end segments will preferably have one face which is perpendicular to the axis of the end segments, so that they can be then clamped by the end segments in a conventional cylindrical pipe joining machine like FIG. 1 and a pipe length in the second clamp and the pipe and the sweep join together along the surface 64.

As shown in FIG. 4, the segments 68 are shown with symmetrical faces so that each face is at the same angle to the axis of the pipe. This is important since in joining the two pipes, the actual contour of the surface at the joint of the two pipes must be identical, and since they will be ellipses and the precise shape of the ellipses will be determined by the angle of the cut, it is important that the angles of each face be the same so as to permit the fusion joining in the manner illustrated in FIG. 5.

It will be clear that the two inserts 76, 74 will be the same for each clamp 14 and 16, although one set will be turned 180° from the other. That is, the projection 84 will be on the outside of each clamp.

It will be clear that in a segment as in FIG. 4, the planes of the faces will each be at an angle A to the plane perpendicular to the axis of the segment, when measured in a plane passed through the axis of the segment.

While the invention has been described with a certain degree of particularity, it is manifest that many changes may be made to the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled. For example, although polyethylene pipe has been specifically referred to herein, it is to be understood that the invention is adaptable to other poly-olefin pipe materials or any fusible pipe material.

What is claimed:

1. In an apparatus for joining pipes by the fusion process, including a frame, a first clamp fixed to said frame and a movable clamp and insert jaw means in each of said clamps having circular cylindrical openings normally adapted to hold separate circular cylindrical pipes in alignment, along a horizontal axis line said movable clamp movably supported upon guide rods, said rods fixed to said frame on each side of said pipe, the axes of which lie in an imaginary plane which intersects the said horizontal axis line, the improvement comprising;

a. a first pair of insert jaws for said fixed clamp in which the circular cylindrical opening is inclined at a vertical angle A, where "A" is greater than 0° and less than 90°, to said horizontal axis line in a selected plane, through said axis line;

b. a second pair of insert jaws for said movable clamp in which the circular cylindrical opening is inclined at a vertical angle A to said horizontal axis line in said selected plane;

means to axially move said movable clamp towards and away from said fixed clamp, whereby two pieces of pipe can be fused together with their axes forming an angle of 2A°, each with a first face with its plane at an angle (90°−A) to the axis of the pipe, can be clamped, one in fixed clamp, and the other in said movable clamp, with their faces parallel and perpendicular to said horizontal axis line.

2. Apparatus of claim 1 wherein said means to move said movable clamp includes mechanical or fluid pressure means.

3. Apparatus of claim 1 including means to heat the faces of said pipe.

* * * * *